(12) United States Patent
Chien

(10) Patent No.: US 8,665,330 B2
(45) Date of Patent: Mar. 4, 2014

(54) EVENT-TRIGGERED SECURITY SURVEILLANCE AND CONTROL SYSTEM, EVENT-TRIGGERED SECURITY SURVEILLANCE AND CONTROL METHOD, AND NON-TRANSITORY COMPUTER READABLE MEDIUM

(75) Inventor: Huang-Jen Chien, New Taipei (TW)

(73) Assignee: AV Tech Corporation, New Taipei (TW)

( * ) Notice: Subject to any disclaimer, the term of this patent is extended or adjusted under 35 U.S.C. 154(b) by 224 days.

(21) Appl. No.: 13/032,224

(22) Filed: Feb. 22, 2011

(65) Prior Publication Data
US 2012/0162417 A1    Jun. 28, 2012

(30) Foreign Application Priority Data
Dec. 23, 2010    (TW) ............................... 99145584 A

(51) Int. Cl.
*H04N 7/18*    (2006.01)
(52) U.S. Cl.
USPC ........................................................ 348/143
(58) Field of Classification Search
USPC ........................................................ 348/143
See application file for complete search history.

(56) References Cited

U.S. PATENT DOCUMENTS

| | | | |
|---|---|---|---|
| 6,583,813 B1* | 6/2003 | Enright et al. | 348/150 |
| 7,412,112 B2* | 8/2008 | Yamasaki | 382/284 |
| 2004/0080615 A1* | 4/2004 | Klein et al. | 348/143 |
| 2009/0174772 A1* | 7/2009 | Tapp et al. | 348/143 |
| 2011/0018998 A1* | 1/2011 | Guzik | 348/143 |

* cited by examiner

*Primary Examiner* — Nhon Diep
*Assistant Examiner* — Leron Beck
(74) *Attorney, Agent, or Firm* — Che-Yang Chen; Law Office of Michael Chen

(57) ABSTRACT

The present invention discloses a security surveillance system and a method thereof, a computer readable storage media and a computer program product. The security surveillance system comprises a surveillance host and an electrical apparatus. The surveillance host could send a monitoring data of a period of a first event occurs to the electrical apparatus through the network when the first event occurs. While the electrical apparatus is playing the monitoring data and a second event occurs, the electrical apparatus switches directly to play the real-time monitoring data corresponding to the second event sent from the surveillance host, so as to achieve the purpose of grasping the site situation immediately.

15 Claims, 4 Drawing Sheets

EVENT-TRIGGERED SECURITY SURVEILLANCE AND CONTROL SYSTEM, EVENT-TRIGGERED SECURITY SURVEILLANCE AND CONTROL METHOD, AND NON-TRANSITORY COMPUTER READABLE MEDIUM

FIELD

The exemplary embodiment(s) of the present invention relates to a field of security control system and a method thereof, a computer readable media and a computer readable program product. More specifically, the exemplary embodiment(s) of the present invention relates to a security control system and a method thereof, a computer readable media and a computer readable program product applicable to a mobile electronic apparatus.

BACKGROUND

Nowadays, with the security control system being paid much attention daily and daily, the security control system is continuously developed and released to the market to meet the need of various occasions, especially the security control system for the occasions of business, house and in public.

The conventional monitoring system comprises at least one camera, at least one alarm apparatus, a monitoring end server and a computer or a mobile phone for user monitoring a scene in real time. The camera and the alarm apparatus disposed at the scene could transmit the monitoring data and the trigger signal to the monitoring end server through the Internet. When an event is emerging, mostly the monitoring end sever reminds the user who uses a mobile phone through a short message service (SMS). After the user opening and viewing the message, the server would transmit the monitoring data corresponding to the trigger signal to the user's mobile phone, so the user could handle the situation in real time. However, the user must pay for the short message service and it causes an economic pressure to the user. Besides, if the event is emerging simultaneously, for example a thief first breaks the window, walks into the vault, opens the strongbox, and then leaves the scene from the back door . . . etc., then each event would be pumped up by the short message, and the user must first exit the viewing of the monitoring data of the previous event and open each message to view the monitoring data of the emerging event. The aforementioned procedure of the conventional security control system thus has the problem of wasting time and inconvenience of viewing.

In summary, the inventors of the present invention thinks and designs a security control system and a method thereof, a computer readable media and a computer readable program product for improving prior art to increase the industry implementation.

SUMMARY

To solve the problems in the conventional arts, it is a primary object of the present invention to provide a to solve the problem of wasting time and inconvenience of viewing of the prior art that when a second even is emerging during the user viewing the monitoring data of the first event, the user needs to first exit the viewing of the monitoring data of the first event and open the message to view the monitoring data of the second event.

To achieve the above object, a security control method according to the present invention is disclosed, which is applicable to a security control system having a monitoring host and an electronic apparatus, the monitoring host comprises a plurality of monitoring data capturing units, a first communication unit and a first processing unit, the electronic apparatus comprises a second communication unit, a second processing unit and a monitoring data playing unit. The security control method comprises the following steps of: capturing and recording the monitoring data by each of the monitoring data capturing unit; controlling the first communication unit by the first processing unit to transmit an event informing message through a transmitting network to the electronic apparatus when the first processing unit determines that a first event is emerging; receiving the event informing message by the second communication unit through the transmitting network; executing an informing procedure by the second processing unit according to the event informing message, and the second processing unit controlling the second communication unit transmitting a response message to the first communication unit; transmitting the monitoring data of the first event to the electronic apparatus when the first processing unit receives the response message via the first communication unit; determining whether or not a second event is emerging by the first processing unit during the electronic apparatus playing the monitoring data of the first event; transmitting the monitoring data of the second event in real time to the electronic apparatus when the second event is emerging during the electronic apparatus playing the monitoring data of the first event; and playing the monitoring data of the second event by the electronic apparatus.

Wherein the monitoring data of the first event is recorded from a predetermined time interval before the emerging of the first event.

Wherein the monitoring host further comprises a plurality of sensors, and the step of determining whether or not the first or/and second event is emerging further comprises the following steps of: executing sensing by each of the sensors according to a sensing condition; and outputting a sensing signal when the sensing condition is confirmed.

Wherein the step of determining whether or not the first or/and second event is emerging further comprises the following steps of analyzing the monitoring data by the first processing unit, and outputting a trigger signal when a trigger condition is confirmed.

Wherein the security control method further comprise the following steps of streaming the monitoring data to the electronic apparatus by the first processing unit via the first communication unit.

To achieve another object, a security control system according to the present invention is disclosed, which comprises a monitoring host and an electronic apparatus, the monitoring host comprises a first processing unit connecting to a plurality of monitoring data capturing units and a first communication unit, each of the monitoring data capturing unit captures and records the monitoring data; the electronic apparatus comprises a second processing unit connecting to a second communication unit and a monitoring data playing unit. wherein, when the first processing unit determines that a first event is emerging, the first processing unit would controls the first communication unit to transmit an event informing message through a transmitting network to the electronic apparatus; after the electronic apparatus receiving the event informing message via the second communication unit through the transmitting network, the second processing unit would executes an informing procedure according to the event informing message, and the second processing unit further controls the second communication unit transmitting a response message to the first communication unit; when the first processing unit receives the response message via the first communication unit, the first processing unit would transmits the monitoring data of the first event to the electronic apparatus; when the first processing unit determines that a second event is emerging during the electronic apparatus playing the monitoring data of the first event, then the first communication unit would transmit the monitoring data of the second event in real time to the electronic apparatus, and the electronic apparatus would play the monitoring data of the second event.

Wherein the monitoring data of the first event is recorded from a predetermined time interval before the emerging of the first event.

Wherein the monitoring host further comprises a plurality of sensors, and each of the sensors executing sensing according to a sensing condition; when the sensing condition is confirmed, the sensors would output a sensing signal to the first processing unit for the first processing unit determining whether or not the first or/and second event is emerging.

Wherein the first processing unit analyzes the monitoring data and outputs a trigger signal when a trigger condition is confirmed.

Wherein the first processing unit streams the monitoring data via the first communication unit to the electronic apparatus.

To achieve another object, a computer readable media according to the present invention is disclosed, which comprises codes and when a processor reads and executes the codes, the above-mentioned security control method would be accomplished.

To achieve another object, a computer program product according to the present invention is disclosed, which comprises codes and when a processor reads and executes the codes, the above-mentioned security control method would be accomplished.

With the above arrangements, the security control system and method thereof, the computer readable media and the computer readable program product according to the present invention could switch the electronic apparatus to display the real-time monitoring data of the second event by the monitoring host actively streaming the monitoring data corresponding to the second event to the electronic apparatus during the electronic apparatus playing the monitoring data of the first event. The user thus could handle the situation of the events, and the present invention dose solve the problem of inconvenience of viewing of the prior art that when a later even is emerging during the user viewing the monitoring data of the previous event, the user needs to first exit the viewing and then the monitoring data of the next event could be viewed by the user. The present invention could further increase the convenience of using the security control system.

With these and other objects, advantages, and features of the invention that may become hereinafter apparent, the nature of the invention may be more clearly understood by reference to the detailed description of the invention, the embodiments and to the several drawings herein.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Exemplary embodiments of the present invention are described herein in the context of a security control system and a method thereof, a computer readable media and a computer readable program product Those of ordinary skilled in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and the following detailed description to refer to the same or like parts.

Figure 1:
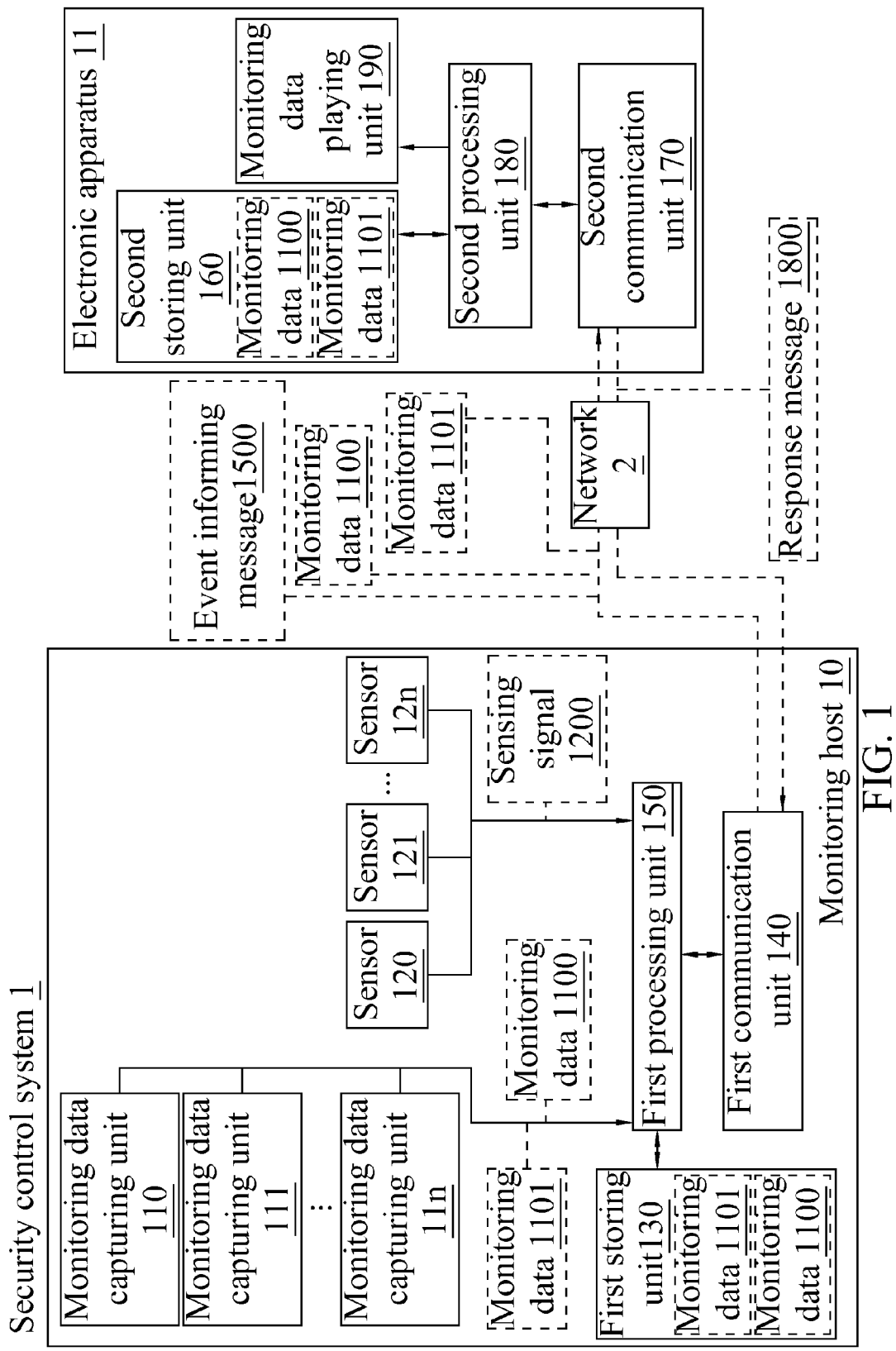
FIG. 1 illustrates a block diagram of the security control system in accordance with the present invention.

Please refer to FIGS. 1, which illustrates a block diagram of the security control system in accordance with the present invention. As shown in the figure, the security control system 1 of the present invention comprises a monitoring host 10 and at least one electronic apparatus 11. The monitoring host 10 comprises a plurality of monitoring data capturing units 110, 111 . . . 11n, a plurality of sensors 120, 121 . . . 12n, a first storing unit 130, a first communication unit 140 and a first processing unit 150. Each of the electronic apparatus 11 comprises a second storing unit 160, a second communication unit 170, a second processing unit 180 and a monitoring data playing unit 190. The first processing unit 150 and the second processing unit 180 are but not limited to central processing unit (CPU) or micro-processing unit (MPU); the electronic apparatus 11 could be computer, notebook, mobile phone, personal digital assistant (PDA) or the combination of the above-mentioned apparatus.

The plurality of monitoring data capturing units 110, 111, . . . , 11n could be all kinds of image, video or sound capturing apparatus, such as (but not limit to) camera, video camera, IR monitoring lens, web cam, high sensitivity microphone or the combination of the above-mentioned apparatus. The monitoring data capturing units 110, 111 . . . 11n connect to the first processing unit 150, and capture and record the monitoring data 1100.

The first storing unit 130 and the second storing unit 160 could be all kinds of storing media, such as embedded memory, external memory or memory card, disk or CD ROM. The first storing unit 130 and the second storing unit 160 connect to the first processing unit 150 and the second processing unit 180 respectively, and the monitoring data 1100 could be stored in the first storing unit 130 and the second storing unit 160.

The plurality of sensors 120, 121, . . . , 12n could be all kinds of sensors, such as (but not limit to) window sensor, smoke sensor, vibration sensor, magnetic sensor, temperature sensor, fire sensor, IR sensor, card reader, RFID reader or the combination of the above-mentioned apparatus. The sensors 120, 121 . . . 12n connect to the first processing unit 150, and execute sensing according to a sensing condition corresponding to each of the sensors 120, 121 . . . 12n. When the sensing condition is confirmed, the sensors 120, 121 . . . 12n output a sensing signal 1200.

The first processing 150 could determine whether or not there is an unusual event emerging according to the sensors 120, 121 . . . 12n or analyzing the monitoring data 1100. For example, when the window sensor senses the window is broken and provides the sensing signal 1200 to the first processing 150, then the first processing unit 150 determines that there is an vent emerging; or when the first processing unit 150 analyzes the monitoring data 1100 and find that there is an unusual situation, such as (but not limit to) a man walking through in the image or the sound being unusual, then the first processing unit 150 determines that a first event is emerging. When the first processing unit 150 determines that a first event is emerging, the first processing unit 150 would control the first communication unit 140 to transmit an event informing message 1500 to each electronic apparatus 11 through the network 2. The electronic apparatus 11 receives the event informing message 1500 via the second communication unit 170, thereby the second processing unit 180 could execute an informing procedure according to the event informing message 1500. The informing procedure could be a beep, a vibration, an informing frame generated by the electronic apparatus 11, or the combination of the above-mentioned means. The users could use electronic apparatus to transmit a response message 1800 to the first communication unit 140 through via the second communication unit 170. When the first processing unit 150 receives the response message 1800 through the first communication unit 140, the first processing unit 150 would transmit the monitoring data 1100 during the emerging of the first event to the electronic apparatus 11.

Wherein, the time of the monitoring data 1100 during the emerging of the first event could be ranged from a predetermined time before the first event emerging to a certain time after the first event emerged. The predetermined time, for example, could be one minute before the emerging of the first event, and the certain time after the first event emerged could be the finished timed of the first event. For example, when the monitoring service provider sent someone to the scene and the first event is handled, then the first event would be deregulated or the user could determine whether or not stop the monitoring host continuously transmitting the monitoring data corresponding to the first event through the electronic apparatus.

It is worth to noting that when the monitoring data playing unit 190 (such as display monitor, speaker or the combination of both) plays the monitoring data 1100, if the first processing unit 150 determines that there is a second event emerging, then the first processing unit 150 would transmit the monitoring data 1101 corresponding to the second event through the first communication unit 140 to the electronic apparatus 11. When the electronic apparatus 11. receive the monitoring data 1101 corresponding to the second event through the second communication unit 170, the second processing unit 180 would control the monitoring data playing unit 190 to switch to play the monitoring data 1101 corresponding to the second event. In other words, if there is a second event emerging during the electronic apparatus 11 playing the monitoring data 1100 corresponding to the first event, the user need not to exit the frame being played and send a response message according to the second event and then the monitoring data 1101 corresponding to the second event thus could be played, the user could switch the monitoring data playing unit 190 to play the monitoring data 1101 corresponding to the second event during the electronic apparatus 11 playing the monitoring data 1100 corresponding to the first event through the security control system 1 in accordance with the present invention. The monitoring data 1100, 1101 could be stored in the second storing unit 160, and the user could easily and control the scene in real time, so as to further increase the convenience of using the security control system.

Besides, the first processing unit 150 determines whether or not there is an event emerging according to a sensing signal 1200 output by each of the sensors 120, 121 . . . 12n when the situation of the scene matches with the sensing condition; or the first processing unit 150 analyzes the monitoring data captured by the sensors 120, 121 . . . 12n, and when the above-mentioned monitoring data match with a trigger condition, the first processing unit 150 would generate a trigger signal (not shown in the figure) and determine that there is an event emerging.

Figure 2:
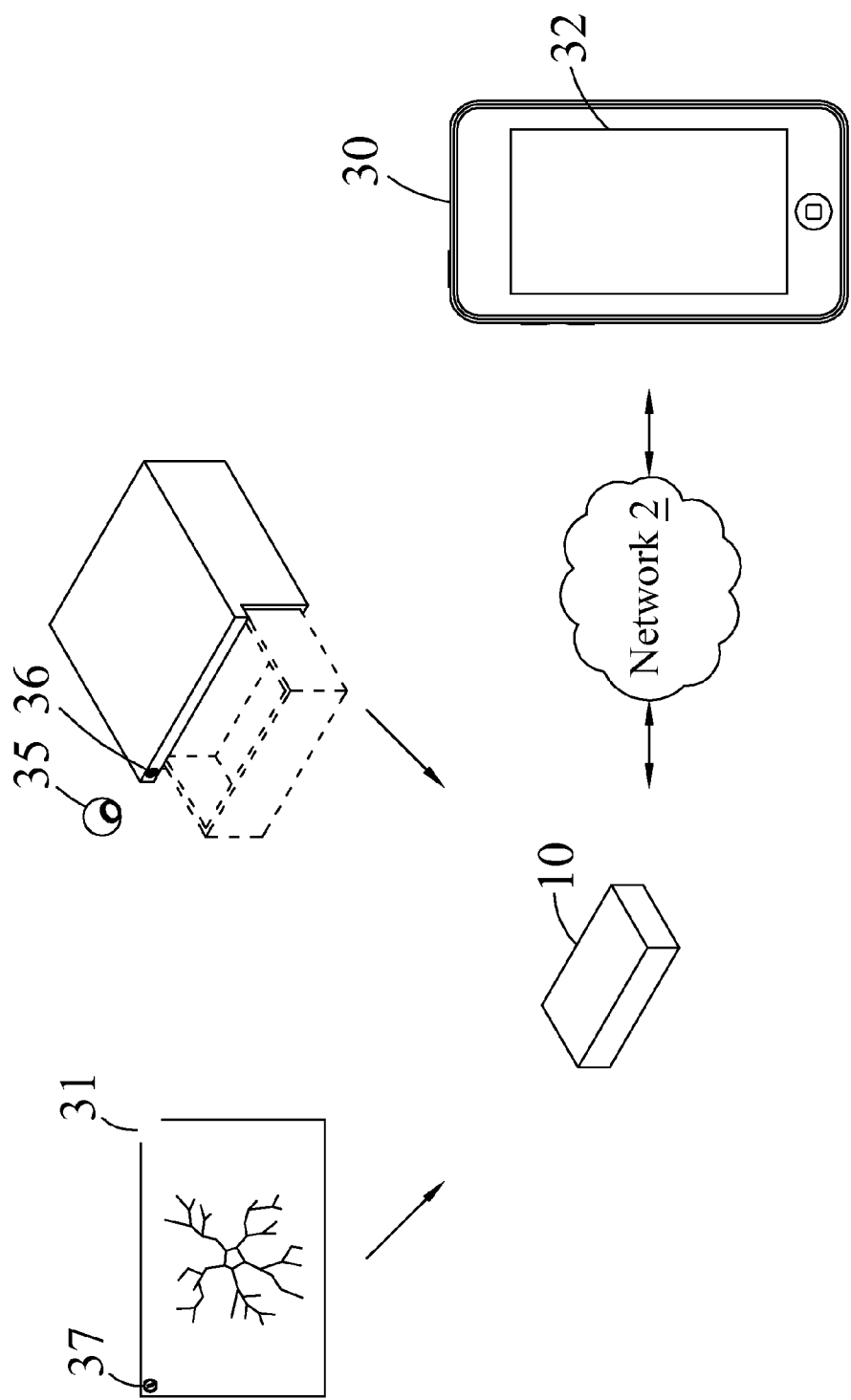
FIG. 2 illustrates a schematic diagram of the security control system in accordance with the present invention.
Figure 3:
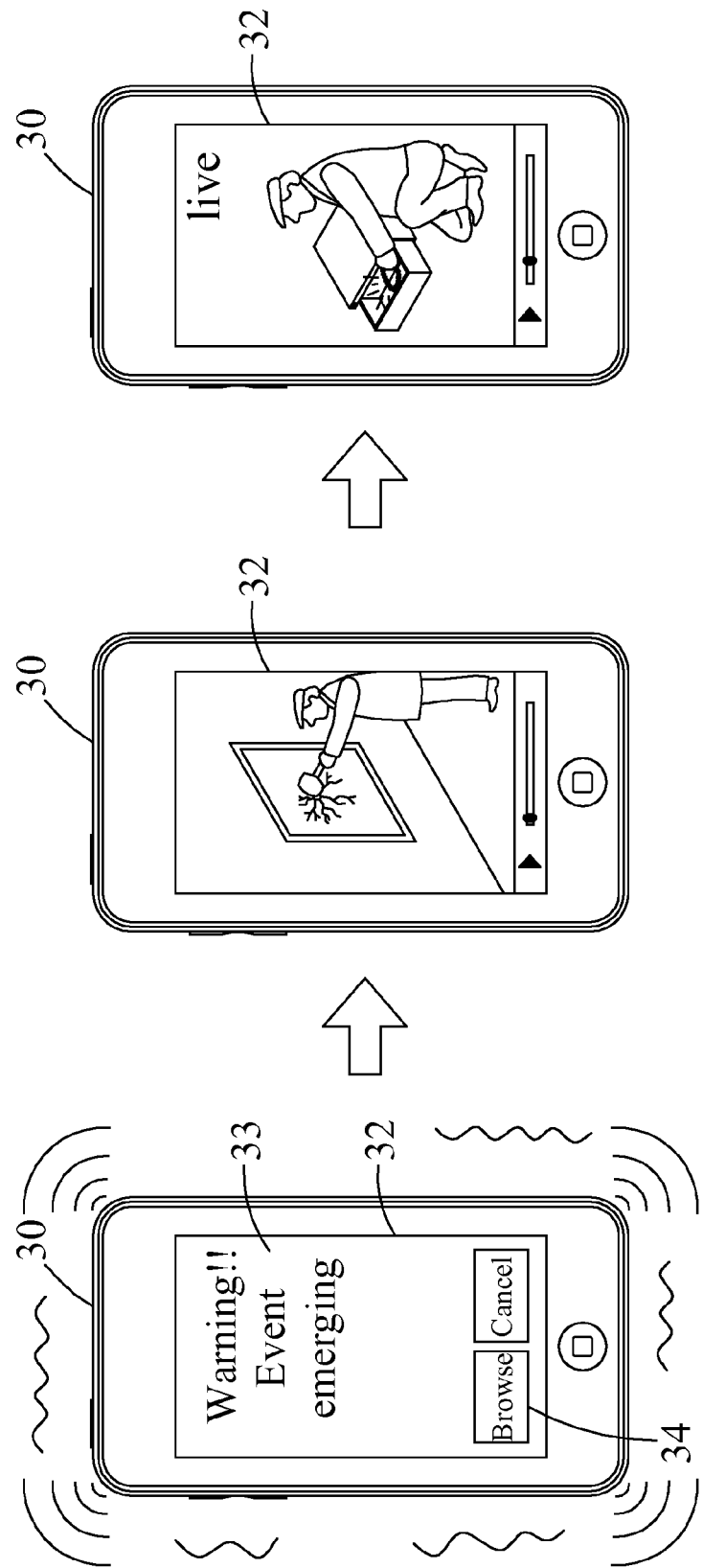
FIG. 3 illustrates a schematic diagram of displaying the frame of the security control system in accordance with the present invention.

Please refer to FIG. 2 and FIG. 3 simultaneously, which illustrates a schematic diagram of the security control system and displaying the frame in accordance with the present invention. As shown in FIG. 2, in this embodiment, there is a thief breaking the window, going into the vault and stealing the jewelry in the strongbox. The first event is that when the thief breaks the window, the window sensor 37 would senses that the window is broken and transmits a sensing signal to the monitoring host 10. The monitoring host 10 connects to a video capturing apparatus such as a web cam 31, and the monitoring host 10 could monitor the window and record the monitoring data. The monitoring host 10 could transmit an event informing message to the personal digital assistant 30.

As shown in FIG. 3, when the event informing message is received by the personal digital assistant 30, then an indicating frame 33 would be displayed on the screen 32 with a vibration and an indication sound by the personal digital assistant 30. When the user selects the "browse" button 34, the personal digital assistant 30 would correspondingly transmit the response message to the monitoring host 10. The monitoring host 10 would then stream the monitoring data recorded from a backtracking time before the first event emerging to a certain time after the first event emerging to the personal digital assistant 30. By streaming the monitoring data to the personal digital assistant 30, the time delay due to fully downloading the monitoring data would be avoided, and the monitoring data could be played and downloaded at the same time so as to view the scene in real time.

Next, the second event of the thief stealing the jewelry in the strongbox is emerging during the user playing the monitoring data. The monitoring host 10 could determine whether the strongbox is opened or not by analyzing the monitoring data of the strongbox monitored by the web cam 35. For example, The monitoring host 10 analyzes the monitoring data to determine that whether or not there is a subject moving in the images (trigger condition), and when there is a subject moving, the first processing unit would generate a trigger signal and determine that there is a second event emerging according to the trigger signal. Besides, the user could dispose a vibration sensor 36 on the strongbox to sense the vibration of the strongbox and then transmit a sensing signal to the monitoring host 10, and thus the monitoring host 10 could find that the second event is emerging. If the monitoring host 10 determines that the second event is emerging during the screen 32 playing the monitoring data corresponding to the first event recorded from a backtracking time before the first event emerging to a certain time after the first event emerging, then the monitoring host 10 would transmit the monitoring data corresponding to the second event to the personal digital assistant 30. When the personal digital assistant 30 receives the monitoring data corresponding to the second event, the personal digital assistant 30 would stop playing the monitoring data corresponding to the first event and switch to play the monitoring data corresponding to the second event. Thus the thief would be under controlled in real time, and the solution corresponding to the event could be processed quickly.

In addition, 2 events and one personal digital assistant are taken as an example to describe the concept of the present invention in the afore-described embodiment, however, those of ordinary in the art would realized easily and could extend to a plurality of events and a plurality of electronic apparatuses, so as to allow pluralities of users to handle these events simultaneously. Besides, the present invention dose not limit the type and model of the electronic apparatus, it is depended on the user's convenience. Further, the aforementioned way of transiting through a network is just for example and not a limitation.

The concept of the security control method in accordance to the present invention is simultaneously described in the description of the security control system disclosed in the present invention, but in order to get clearer, the following will still illustrate the flow chart of the security control method.

Figure 4:
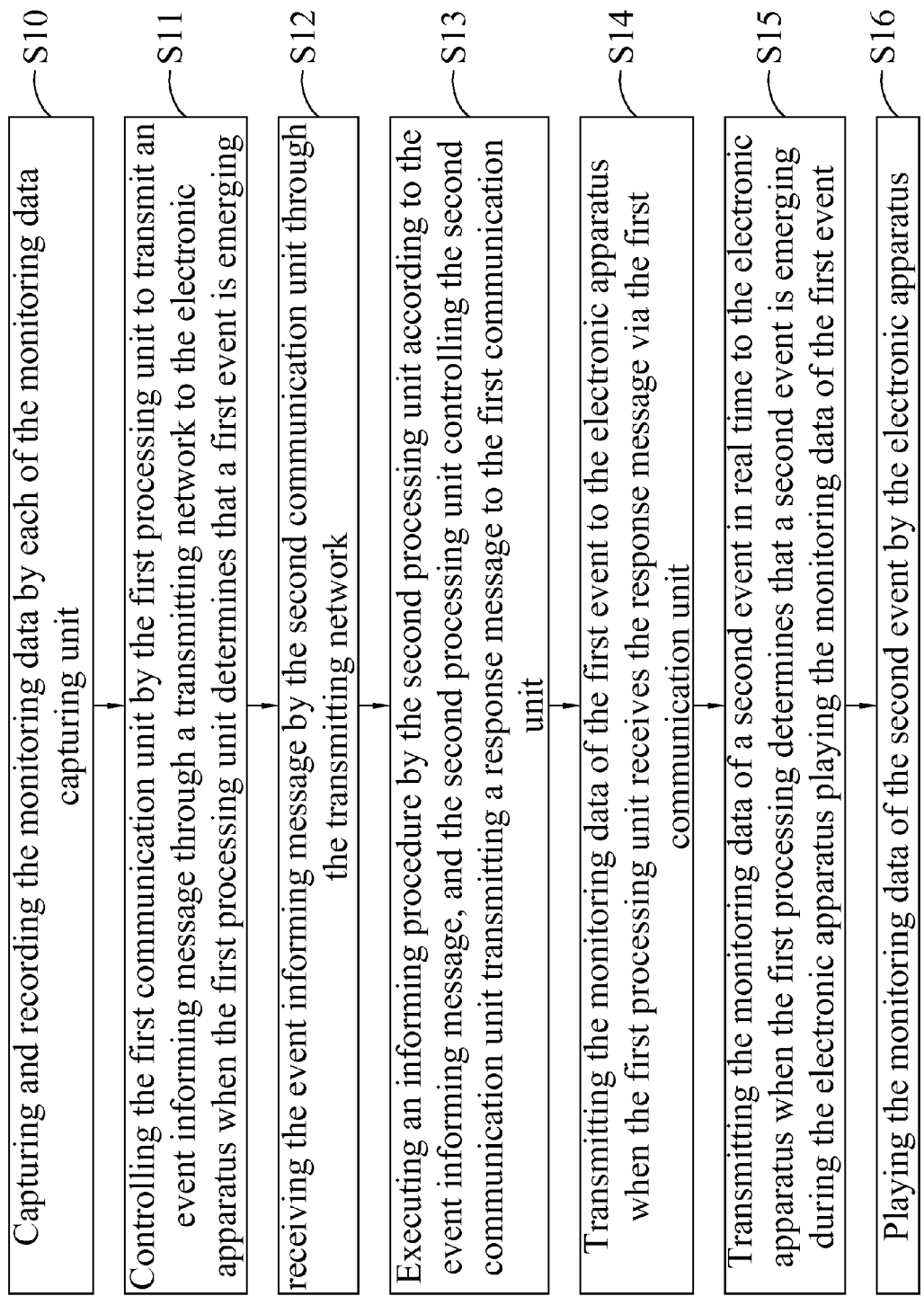
FIG. 4 illustrates a flow chart of the security control method in accordance with the present invention.

Please refer to FIG. 4, which illustrates a flow chart of the security control method in accordance with the present invention. The security control method is applicable to a security control system having a monitoring host and an electronic apparatus. The monitoring host comprises a plurality of monitoring data capturing units, a first communication unit and a first processing unit. The electronic apparatus comprises a second communication unit, a second processing unit and a monitoring data playing unit. The security control method comprises the following steps of:

(S10) capturing and recording the monitoring data by each of the monitoring data capturing unit;

(S11) controlling the first communication unit by the first processing unit to transmit an event informing message through a transmitting network to the electronic apparatus when the first processing unit determines that a first event is emerging;

(S12) receiving the event informing message by the second communication unit through the transmitting network;

(S13) executing an informing procedure by the second processing unit according to the event informing message, and the second processing unit controlling the second communication unit transmitting a response message to the first communication unit;

(S14) transmitting the monitoring data of the first event to the electronic apparatus when the first processing unit receives the response message via the first communication unit;

(S16) transmitting the monitoring data of a second event in real time to the electronic apparatus when the first processing determines that a second event is emerging during the electronic apparatus playing the monitoring data of the first event; and (S16) playing the monitoring data of the second event by the electronic apparatus.

Wherein the step of determining whether or not the first or/and second event is emerging further comprises the following step of: executing sensing by each of the sensors according to a sensing condition, and outputting a sensing signal when the sensing condition is confirmed; or analyzing the monitoring data by the first processing unit, and outputting a trigger signal when a trigger condition is confirmed.

Besides, the step of transmitting the monitoring data corresponding the first or second event by the first processing unit through the first communication unit further comprises the step of streaming the monitoring data to the electronic apparatus by the first processing unit via the first communication unit.

The implementation of the security control method in accordance with the present invention has already described in the description of the embodiments of the security control system according to the present invention, so it will not be stated here again.

The preferred embodiments has already been described above, and expect the examples of the above embodiments, each of the above-mentioned units could be implemented by using software, hardware devices or the combination of both with some necessary firmware devices. In addition, the security control system could be implemented by using storing media; the storing media could be CD-ROM, hard disk, flash drives or the like. The storing media comprises codes, when a processor reads and executes the codes, the security control method of the steps of (S10)~(S15) would be accomplished. On the other hand, the present invention could be implemented by using a computer product. The computer product comprises codes, when a processor reads and executes the codes, the method described in the above embodiments would be accomplished. Selectively, the computer product could be transmitted through the internet or other ways.

In summary, the security control system and the method thereof, the computer readable media and the computer readable program product overcome the problem of wasting time and inconvenient use that the prior art has to stop playing the monitoring data and exit the playing frame, and then choose the monitoring data of the next event to play. The monitoring host of the present invention would actively stream the real time monitoring data corresponding to the second event to the electronic apparatus during the electronic apparatus playing the monitoring data recorded in the duration of the first event, and the electronic apparatus would switch to display the monitoring data corresponding to the second event immediately, thus the user could make a decision according to the real time monitoring data. Further, the time delay due to fully downloading the monitoring data would be avoided, and the monitoring data could be played and downloaded at the same time so as to achieve the goal of controlling the scene immediately.

While particular embodiments of the present invention have been shown and described, it will be obvious to those skilled in the art that, based upon the teachings herein, changes and modifications may be made without departing from this invention and its broader aspects. Therefore, the appended claims are intended to encompass within their scope of all such changes and modifications as are within the true spirit and scope of the exemplary embodiment(s) of the present invention.

What is claimed is:

1. A event-triggered security surveillance and control method, which is applicable to a security surveillance and control system having a monitoring host and an electronic apparatus, the monitoring host comprising a plurality of monitoring data capturing units, a first communication unit and a first processing unit, the electronic apparatus comprising a second communication unit, a second processing unit and a monitoring data playing unit, the security surveillance and control method comprising:

capturing and recording monitoring data by each of the monitoring data capturing unit;

determining whether or not a first event is emerging by the first processing unit;

controlling the first communication unit by the first processing unit to transmit an event informing message through a transmitting network to the electronic apparatus only in response to that the first processing unit determines that the first event is emerging;

receiving the event informing message by the second communication unit through the transmitting network;

executing an informing procedure by the second processing unit according to the event informing message, and the second processing unit controlling the second communication unit transmitting a response message to the first communication unit;

transmitting the monitoring data of the first event to the electronic apparatus only in response to that the first processing unit receives the response message via the first communication unit and displaying the monitoring data of the first event by the monitoring data playing unit of the electronic apparatus;

determining whether or not a second event is emerging by the first processing unit;

transmitting the monitoring data of the second event in real time to the electronic apparatus in response to that the first processing unit determines that the second event is emerging during the electronic apparatus playing the monitoring data of the first event; and controlling the monitoring data playing unit to switch to display the monitoring data of the second event by the electronic apparatus upon receiving the monitoring data of the second event.

2. The event-triggered security surveillance and control method of claim 1, wherein the monitoring data of the first event is recorded from a predetermined time interval before the first event emerging to a time point after the first event emerged, and the predetermined time interval is greater than 0 such that the monitoring data of the first event include information taking place before the first event.

3. The event-triggered security surveillance and control method of claim 1, wherein the monitoring host further comprises a plurality of sensors, and the steps of determining whether or not the first event and the second event are emerging further comprise the following steps of:

executing sensing by each of the sensors according to a sensing condition; and outputting a sensing signal when the sensing condition is confirmed.

4. The event-triggered security surveillance and control method of claim 1, wherein the steps of determining whether or not the first event and the second event are emerging further comprise the following steps of:

analyzing the monitoring data by the first processing unit, and outputting a trigger signal when a trigger condition is confirmed.

5. The event-triggered security surveillance and control method of claim 1, further comprising the following steps of:

streaming the monitoring data to the electronic apparatus by the first processing unit via the first communication unit.

6. A event-triggered security surveillance and control system, comprising a monitoring host and an electronic apparatus, the monitoring host comprising a first processing unit connecting to a plurality of monitoring data capturing units and determining whether or not a first event and a second event are emerging and a first communication unit, each of the monitoring data capturing unit capturing and recording monitoring data; the electronic apparatus comprising a second processing unit connecting to a second communication unit and a monitoring data playing unit, wherein, only in response to that the first processing unit determines that the first event is emerging, the first processing unit controls the first communication unit to transmit an event informing message through a transmitting network to the electronic apparatus; after the electronic apparatus receiving the event informing message via the second communication unit through the transmitting network, the second processing unit executes an informing procedure according to the event informing message, and the second processing unit further controls the second communication unit transmitting a response message to the first communication unit; only in response to that the first processing unit receives the response message via the first communication unit and displaying the monitoring data of the first event by the monitoring data playing unit of the electronic apparatus, the first processing unit transmits the monitoring data of the first event to the electronic apparatus; in response to that the first processing unit determines that the second event is emerging during the electronic apparatus playing the monitoring data of the first event, the first communication unit transmits the monitoring data of the second event in real time to the electronic apparatus, and the electronic apparatus controls the monitoring data playing unit to switch to display the monitoring data of the second event upon receiving the monitoring data of the second event.

7. The event-triggered security surveillance and control system of claim 6, wherein the monitoring data of the first event is recorded from a predetermined time interval before the first event emerging to a time point after the first event emerged, and the predetermined time interval is greater than 0 such that the monitoring data of the first event include information taking place before the first event.

8. The event-triggered security surveillance and control system of claim 6, wherein the monitoring host further comprises a plurality of sensors, and each of the sensors executing sensing according to a sensing condition;

in response to that the sensing condition is confirmed, the sensors outputs a sensing signal to the first processing unit for determining whether or not the first event and the second event are emerging by the first processing unit.

9. The event-triggered security surveillance and control system of claim 6, wherein the first processing unit analyzes the monitoring data and outputs a trigger signal when a trigger condition is confirmed for determining whether or not the first event and the second event are emerging by the first processing unit.

10. The event-triggered security surveillance and control system of claim 6, wherein the first processing unit streams the monitoring data via the first communication unit to the electronic apparatus.

11. A non-transitory computer readable medium, comprising codes, wherein in response to that a processor reads and executes the codes, the method of claim 1 is accomplished.

12. The non-transitory computer readable medium of claim 11, wherein in response to that the processor reads and executes the codes, the method of claim 2 is accomplished.

13. The non-transitory computer readable medium of claim 11, wherein in response to that the processor reads and executes the codes, the method of claim 3 is accomplished.

14. The non-transitory computer readable medium of claim 11, wherein in response to that the processor reads and executes the codes, the method of claim 4 is accomplished.

15. The non-transitory computer readable medium of claim 11, wherein in response to that the processor reads and executes the codes, the method of claim 5 is accomplished.

* * * * *